April 13, 1948.  R. E. STURM  2,439,495

HEART BEAT RATE INDICATING APPARATUS

Filed July 14, 1942  2 Sheets-Sheet 1

Fig. 1.

Inventor
Ralph E. Sturm
By Williams, Bradbury & Henke
Attys.

Patented Apr. 13, 1948

2,439,495

UNITED STATES PATENT OFFICE 2,439,495

HEARTBEAT RATE INDICATING APPARATUS

Ralph E. Sturm, Milton, Wis., assignor to The Burdick Corporation, Milton, Wis., a corporation of Delaware Application July 14, 1942, Serial No. 450,890

27 Claims. (Cl. 128—2.05)

My invention relates to heart beat rate indicating apparatus and particularly to electrical apparatus for indicating the rate at which the heart of a human being beats.

Heretofore it has been the almost universal practice to determine the rate at which the heart of a human being beats by feeling the pulse of a person at the wrist or some other place of the body and counting the number of pulsations for a definite period of time, usually a minute. The rate of heart beating was then usually expressed as so many per minute. It is commonly known, at least among doctors, that the heart rate may change materially over a period of one minute, so that the number of beats counted for a minute is not truly expressive of the heart rate. If the number of beats occurring in a shorter period is counted, further errors are likely to occur, particularly because of errors in getting the exact length of time of the shorter period. Attempts have been made to provide electrical instruments for indicating the relatively instantaneous rate of heart beating but these have not proven to be altogether satisfactory.

The primary object of my invention is to provide a new and improved instrument for indicating the relatively instantaneous rate at which the heart beats or pulsates.

A further object of my invention is to provide a new and improved heart beat rate indicating apparatus actuated by electric potentials generated by the heart.

Another object of my invention is to provide a new and improved heart beat rate indicating apparatus actuated by electric potentials generated by the heart and which will indicate the rate of the heart beat and will not be affected by the amplitude or wave shape of the potentials.

Another object of my invention is to provide a new and improved indicating device of the character described wherein the rate is indicated in an easily readable manner so that both the rate and changes therein may be noted readily.

A further object of my invention is to provide a new and improved indicating device of the character described which is rugged in construction, which may be constructed conveniently, in which variations in indications because of temperature changes or aging of parts are minimized, and in which no moving parts other than the indicator itself are utilized.

Further objects and advantages of my invention will become apparent from the ensuing description, in the course of which reference is had to the accompanying drawings, in which.

Figure 1:
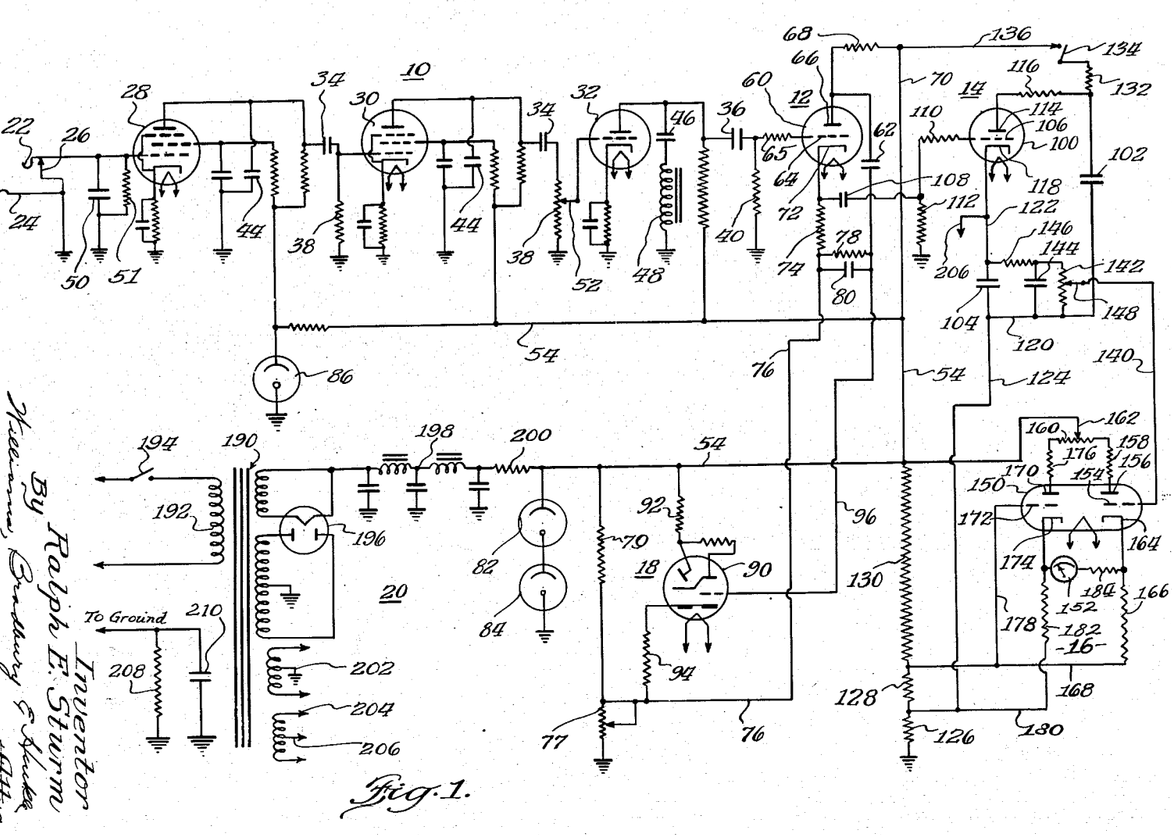
Fig. 1 is a schematic diagram of one embodiment of my invention.

In general, the apparatus illustrated in Fig. 1 includes an amplifier 10 adapted to detect potentials generated by the heart and to amplify frequencies of the order of the R wave (i. e., about between 10 and 18 cycles per second), an electrical impulse providing means 12, means 14 controlled by the impulse providing means for producing a control voltage proportional to the heart rate, and a rate indicating means 16. The apparatus also includes a visual indicating device 18, controlled by the impulse providing device for indicating visually the occurrence of each heart beat. The apparatus is supplied with power through a power pack 20.

The amplifier 10 is constructed and arranged to amplify frequencies of the order of the R wave generated by the heart and to attenuate other frequencies. Each time the heart beats electrical potentials are generated and appear most pronounced at certain parts of the body. Graphs or curves of these potentials are known as electrocardiograms and are utilized in heart diagnosis. Each heart beat produces several characteristic waves, of which the P, Q, R, S, and T waves are the most pronounced in the normal person. It is the R wave, occurring at the beginning of the ventricular systole, that is greatly amplified in my amplifier to provide an impulse each time the heart beats. This wave normally has a greater amplitude than the others and a fundamental frequency higher than that of the T wave, so, by attenuating frequencies lower than that of the R wave, the T waves are discriminated against. The P wave, which has a frequency approaching that of the R wave, has a low magnitude so that it does not affect operation of the apparatus.

The amplifier input terminals 22 and 24 are adapted to be connected to the patient's body through a suitable cable and plug (not shown). The latter terminal is grounded to the chassis of the device and when the cable is not plugged in, the other terminal 22 is also grounded by switch 26 thereby to prevent amplification of extraneous fields when the device is not in use. When the cable plug is inserted in place, input terminal 22 is ungrounded. The input terminals 22 and 24 are preferably connected to the right arm and left leg, respectively, although other parts of the body may be used particularly during studies involving physical exercise or during surgery of the patient.

Electric potentials applied to the amplifier input terminals are amplified by the three tubes 28, 30, and 32, the first two of which may be of the 6SJ7 type, and the last of the 6J5 type. The tubes are resistance-capacity coupled to operate as a cascade amplifier.

In order to attenuate frequencies lower than that of the R wave and to minimize the effect of line voltage surges, the interstage coupling condensers 34, the output coupling condenser 36, the interstage coupling resistors 38, and the output coupling resistor 40 are chosen to provide a time constant which limits the low frequency response of the amplifier. This arrangement thus greatly attenuates the T wave so that it is not present to any substantial extent in the amplifier output.

In order to attenuate the higher frequencies such as those resulting from 60 cycle induction generally present when the amplifier is connected to an unshielded body, bypass condensers 44 are connected to the plates of tubes 28 and 30, a condenser 46, and choke 48 to the plate of tube 32, and a condenser 50 and resistor 51 are connected in parallel to the grid of tube 28.

The gain of the amplifier is adjustable by a movable gain control member 52 associated with coupling resistor 38 located between tubes 30 and 32.

Plate voltage to the amplifier tubes is supplied through a "B" supply line 54 leading to the power pack 20.

The amplified R wave is utilized to control the current impulse producing means 12 which comprises a gas tube 60 (preferably of the 884 type) and a condenser 62 in its plate-cathode circuit. The gas tube is biased to be non-conductive, at which time the condenser is charged, but is rendered conductive upon occurrence of the R wave, at which time the condenser discharges. When the condenser has discharged to a sufficiently low value, which occurs quickly, the tube again becomes non-conductive so that an impulse occurs each time the heart beats. The grid 64 of the tube is connected to the junction of amplifier output coupling condenser 36 and coupling resistor 40 through a resistor 65. The plate 66 is connected to the B supply line 54 through resistor 68 and conductor 70 and the cathode 72 is connected near ground potential through resistor 74 and conductor 76. The condenser 62 has one side connected to the plate and its other side to conductor 76 through the resistor 78 and condenser 80. Conductor 76 is adjustably connected to resistor 77, one end of which is connected to ground and the other end of which is connected through resistor 79 to the B supply line 54.

When the gas tube 60 is non-conductive, the condenser 62 is charged to near the B supply voltage since one side of the condenser is connected to the B supply line through resistor 68 and the other side to near ground through resistor 78 and condenser 80. It is preferred that resistor 68, condenser 62, resistor 78, and condenser 80 be so chosen that condenser 62 is charged to about 63 per cent of the B supply voltage in about one-tenth second.

It may be well at this point to note that the B supply voltage is maintained substantially constant by the two regulator tubes 82 and 84 connected across the B supply. The plate voltage for the first amplifier tube is also regulated by a tube 86. The regulator tubes may all be of the VR150 type.

During occurrence of the R wave, the right arm (to which amplifier input terminal 22 is connected) is negative with respect to the left leg so that with a three tube amplifier such as that shown, this negative potential makes the grid 64 of the gas tube more positive. When this happens, the tube becomes conductive and the condenser 62 discharges through a circuit including the tube and resistor 74. The current impulse flowing through this resistor changes the potential thereof and the potential change is utilized to control the control voltage producing means 14 and the visual indicating means 18. The former of these, it will be remembered, provides a control voltage proportional to the relatively instantaneous rate at which the heart is beating and the latter a visual indication of each heart beat.

The visual indicating means 18 consists of an electron ray indicating tube 90, preferably of the 6U5/6G5 type. Its plate and target are connected to the B supply line 54 through a resistor 92, its cathode to near ground potential through resistor 94 and conductor 76, and the control grid of the triode section to the junction of condenser 62 with resistor 78 and condenser 80 through conductor 96.

When the condenser 62 discharges through the circuit, including resistor 74, condenser 80, and resistor 78, the control grid of tube 90 becomes more negative, the grid being connected to the junction of resistor 78 and condenser 62. As a result the shadow angle narrows and the target glows over a larger area indicating the occurrence of an R wave and a heart beat. The condenser 80 and resistor 78 are arranged with suitable time constants for maintaining the glow of the target for an appreciable period. Thus the electron ray tube "blinks" in synchronism with the heart beat, or more particularly, with the R wave of each heart beat and furnishes an index to the operator that the instrument is operating and apprises him that the heart is beating. It might be noted also that the heart beats could be counted by counting the operations of the electron ray tube.

In the embodiment of Fig. 1, apparatus 14 for producing a control voltage proportional to the rate of the heart beat includes, in the main, a gas tube 100 (also of the 884 type), a first condenser 102 arranged to be charged whenever the tube is non-conductive and to be discharged into a second condenser 104 when the tube is conductive. The tube 100 is rendered conductive for a predetermined constant period that is independent of the duration and shape of the R wave and each time it is rendered conductive the condenser 102 is discharged into condenser 104. The first condenser 102 is relatively small compared to the second condenser 104 and thus raises the charge in condenser 104 to a value dependent upon the rate of heart beat.

Figure 2:
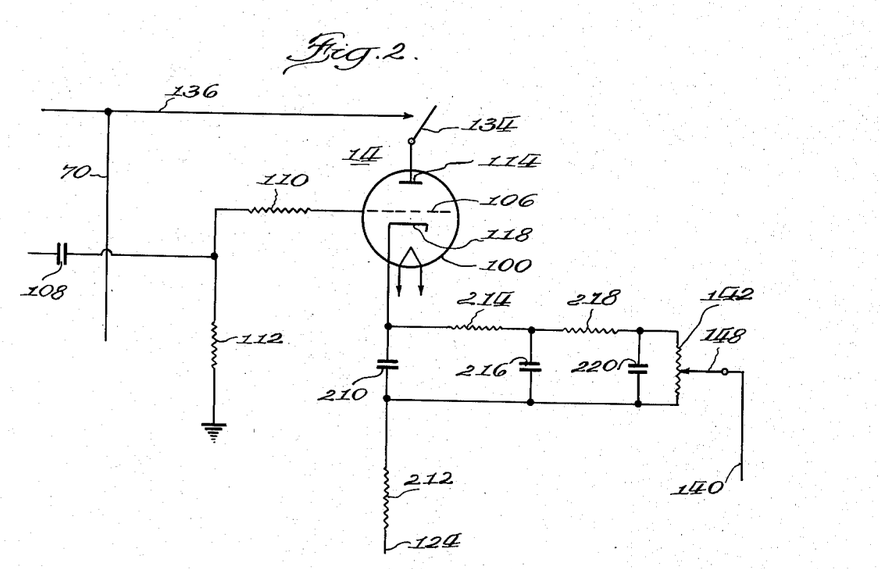
Fig. 2 is a fragmentary schematic diagram illustrating a modified embodiment of my invention.
Figure 3:
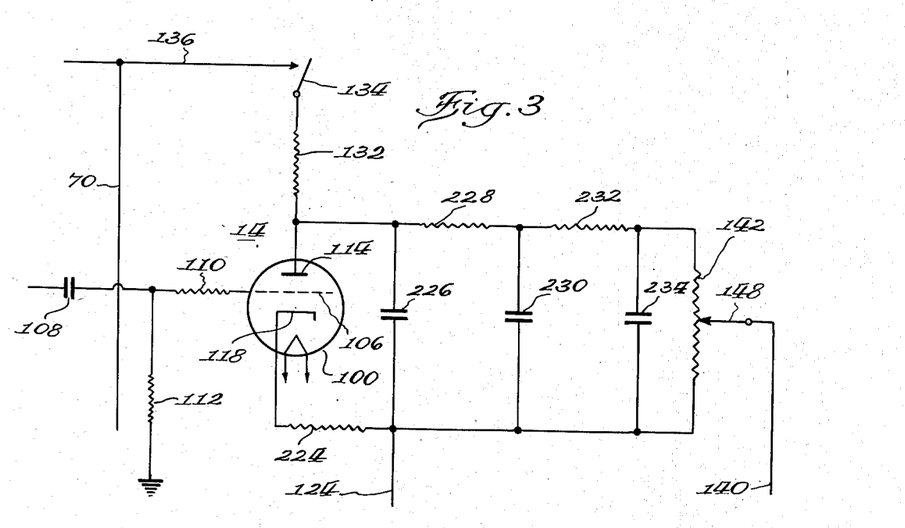
Fig. 3 is a view like Fig. 2 of a further embodiment of the invention.

The apparatus 14 of the embodiment of Fig. 1, wherein the condenser 102 is arranged in manner illustrated and described, is particularly advantageous in that only a relatively small drain is placed upon the B supply. As a result, the B supply voltage regulation is very good and the apparatus 14 does not affect the voltages applied to the amplifier and other circuits. It is possible, however, to use other tube and condenser arrangements wherein a condenser corresponding to condenser 102 is charged when the tube is rendered conductive and discharged when the tube is non-conductive. Such an arrangement is illustrated in Fig. 2 and will be described hereinafter. It is possible also to use an arrangement wherein the condenser corresponding to condenser 102 is charged when the tube is non-conductive and discharged when the tube is conductive, but wherein a condenser corresponding to condenser 104 is also discharged when the tube is conductive. Such an arrangement is illustrated in Fig. 3, to which reference will also be had later.

Returning now to Fig. 1, the gas tube 100 is rendered conductive for a period just long enough to enable condenser 102 to be discharged each time the gas tube 60 is rendered conductive to discharge its associated condenser 62. When the condenser 62 discharges, the current flow through resistor 74 increases and the potential of its cathode end becomes more positive. This more positive potential is applied to the grid 106 of tube 100 to render it conductive through condenser 108 and resistor 110. The junction of condenser 108 and resistor 110 is connected to ground through resistor 112. The time constants of condenser 108 and resistor 112 are so chosen that tube 100 becomes non-conductive when condenser 102 is discharged regardless of whether tube 60 remains conductive for a longer or shorter interval. Thus condenser 102 transfers the same energy to condenser 104 each time it discharges. Thus, when the heart rate is higher, the condenser 102 is discharged into condenser 104 more often per period of time and, when it it lower, it is discharged less often. Consequently, the charge in condenser 104 at any time is dependent upon the average rate at which the heart is beating taken over a very short period of time, such, for instance, as three seconds. In practice, it has been found preferable to limit the highest potential to which condenser 104 is charged to about 25 volts.

The condenser 102 is connected to the plate 114 of tube 100 through resistor 116 and to the cathode 118 of the tube through conductor 120, the condenser 104, and conductor 122. Conductor 120 is also connected near ground potential through conductor 124 and resistor 126, the latter being connected in series with resistors 128 and 130 across the B supply. The junction of condenser 102 and resistor 116 is connected to the B supply line through a resistor 132, switch 134, conductor 136, and the previously mentioned conductor 70. The condenser 102 is charged when tube 100 is non-conductive since one side thereof is connected to the B supply line through resistor 132, switch 134, and conductors 136 and 70, and its other side connected to near ground potential through conductors 120 and 124. When the tube 100 is rendered conductive, condenser 102 discharges through the tube into condenser 104. Switch 134 is preferably a mercury switch to minimize fire hazards that may be present as when the apparatus is used in the presence of inflammable anaesthetics in an operating room. When opened, it functions to render the control voltage producing means 14 inoperative.

A control voltage varying with the average charge of the second condenser 104 is supplied to the indicating apparatus 16 through conductor 140. This voltage is a portion of the voltage drop across resistor 142 which is connected in parallel with condenser 144. The parallel connected resistor and condenser are connected in parallel with condenser 104 through resistor 146. This condenser resistor network is thus so arranged that condenser 104 discharges through resistor 146 into condenser 144 and through resistor 142, and their values are so chosen that the voltage across resistor 142 varies with the average charge of condenser 144, and thus with the heart rate, in such manner that the meter 152 about to be described indicates the rate with but slight crowding at the upper end of the scale. In other words, the arrangement is such that the heart beat rate can be read without difficulty over the full scale of the meter. The portion of the voltage drop supplied to apparatus 16 is adjusted by a movable contact member 148.

To enable the control voltage condenser-resistor network to be made of relatively small condensers and resistors, the control voltage is supplied to the indicating device 16 which includes a twin triode vacuum tube 150 (preferably of the 6F8G type although two separate tubes could be used) and a milliameter 152 preferably with a range from zero to one milliampere) having a scale indicating the heart rate in the number of beats per minute. The voltage applied to the meter is varied in response to the heart beat rate by the control voltage applied to the grid 154 of one of the triode sections through conductor 140. The plate 156 of this one triode section is connected to the B supply line 54 through resistor 158 and a potentiometer constituted by resistor 160 and movable contact 162. The cathode 164 is connected through a biasing resistor 166 and conductor 168 to near ground potential, i. e., to the junction of resistors 128 and 130, which is at a potential slightly above the potential of the junction of resistors 126 and 128.

The second triode section of tube 150 includes a plate 170, a grid 172, and a cathode 174. The plate is connected to the B supply through resistor 176 and the potentiometer 160—162. The grid is connected by conductor 178 to the junction of resistors 128 and 130. The cathode is connected by conductor 180 to the junction of resistors 126 and 128 through biasing resistor 182.

The meter 152 is connected across the cathodes 164 and 174 in series with a resistor 184, the function of which is to minimize changes in meter readings due to changes in the meter resistance, for instance as a result of temperature changes.

The meter circuit arrangement illustrated and described possesses a number of distinct advantages. It possesses more stability in so far as the meter readings are affected by voltage variations of the power supply; it is of a linear nature; and enables a large range of control voltage to be applied to the grid 154 of one of the tube sections, all as will be brought out in the succeeding description.

In a quiescent state, i. e., when the amplifier input is disconnected from a patient or when switch 134 is open, the meter reads zero. Should it not read zero, it can be adjusted to do so by adjusting the potentiometer 160—162. Since the meter is connected across the cathodes 164 and 174, the zero adjustment can be effected by varying the current flow through the two sections of the tube until the cathodes are at the same potential.

The circuit constants are so chosen that in the aforesaid quiescent state there is a voltage drop of about 5 volts across resistor 128. This drop is quite constant since the resistor is connected across the B supply in series with resistors 130 and 126. Current flows through both sections of tube 150, the current through the section including plate 156 and cathode 164 being less than the current through the section including plate 170 and cathode 174 by reason of the grid 154 being connected to a lower potential than grid 172. The grid 172 is connected to the upper end of resistor 128 through conductor 178 while grid 154 is connected to the lower end of the resistor through conductor 140, contact 148, resistor 142, and conductors 120 and 124. The voltage drop across bias resistor 166 is arranged to be about 3 volts, so that grid 154 is about 8 volts negative with respect to cathode 164. The voltage drop across bias resistor 182 is arranged to be about 8 volts so that grid 172 is only about 3 volts negative with respect to cathode 174, and the latter is at the same potential as cathode 164. The meter 152 thus reads zero in the quiescent state and more current flows through one section of the tube than the other.

When the grid 154 is made more positive, as it is when the apparatus is in operation, and condenser 102 is being discharged into condenser 104 in response to the heart beat rate, then the current flow through section 156—164 is increased. Assuming that the potential of grid 154 is raised 2 volts, then the grid is only 6 volts negative with respect to cathode 164. The increased current flow increases the voltage drop across resistor 166 and cathode 164 is thus at a higher potential than cathode 174 and, as a result, current flows through meter 152 causing it to indicate the number of heart beats. The current flowing through meter 152 also flows through bias resistor 182 so that the potential of cathode 174 is raised, making its associated grid 172 more negative with respect to it. The current flow through that section of the tube is therefore decreased with a resulting decrease in current flow in bias resistor 182. This decrease in current flow lowers the potential of cathode 174. Thus cathode 174 is maintained at a more constant potential due to the increased flow through tube section 156—164 and the decreased flow through section 170—174. Consequently, a change in potential of grid 154 produces a change in the meter reading, which thus indicates in heart beats per second the difference in the current flow between the two sections of the tube.

The arrangement whereby grid 154 is more negative to its cathode than grid 172 is to its cathode in a quiescent state enables a greater range in control voltage to be applied to grid 154 before it becomes positive relative to its cathode. The arrangement whereby an increase in current through tube section 156—164 is accompanied by a decrease in current in section 170—174, and vice versa, enables the non-linearity of one tube section to balance out the non-linearity of the other because, since the tubes are operated in opposite directions, the non-linearity of their plate current changes in response to grid voltage changes is in opposite directions and therefore cancel out, the total change in current between the two sections being the same at any point on their curves for a given change in grid voltage.

In order to minimize error in meter readings because of fluctuations in the voltage of the power supply, the tube sections are arranged to pass the same amount of current when the meter is at the midpoint of its scale. A convenient range for the scale is 240 beats per minute, so that the tube sections pass the same current when the meter reads 120 beats per minute. At this point voltage fluctuations, which cause a change in heater current, cause both sections of tube 150 to change alike without disturbing the relative potentials of cathodes 164 and 174 so that the meter reading is unaffected. At points above and below midpoint, a slight change does occur in the meter reading, the change, however, being opposite in direction above to that below the midscale reading. The error is thus split and minimized.

The maximum scale calibration of the meter is adjustable by means of the contact 148 controlling the proportion of voltage drop across resistor 142 that is applied to the grid 154.

The power pack 20 includes a transformer 190, the primary 192 of which may be connected to a suitable source of 60 cycle alternating current upon closure of switch 194. It includes a full wave rectifier 196 connected through a filter 198 and a resistor 200 to the B supply line 54.

The cathode heaters of tubes 28, 30, 32, 60, 90, and 150 are all supplied with current from a secondary winding 202 having its midpoint grounded to the chassis. The cathode heater of tube 100, however, is provided with its own source of current—the secondary winding 204 which is connected, preferably but not necessarily, at its midpoint to the cathode 118 through conductor 206. This arrangement eliminates difficulties otherwise encountered in operation of this tube resulting from difference in potential between the heater and cathode. By connecting the cathode to the transformer winding, these difficulties are eliminated and enables the instrument to be calibrated with assurance that it will operate in a stable manner.

The chassis of the instrument is connected to ground through the parallel connected resistor 208 and condenser 210. This ground connection may be to a waterpipe or other good ground connection.

In operation of the device, the power pack transformer 190 is connected to a source of 60 cycle alternating current by closure of the mercury switch 194 and the other mercury switch 134 is closed. The amplifier input terminals 22 and 24 are connected, preferably, to the right arm and left leg of the patient through a cable and plug and the terminal 22 is thus ungrounded. The amplifier gain control 52 is adjusted so that the visual indicating electron ray tube 90 blinks consistently. The initial calibration of the device is effected by adjustment of the movable contacts 148 and 162, the latter of which controls the zero reading of the meter 152 and the former of which controls the maximum scale reading of the meter as heretofore described in detail.

With the amplifier input terminals properly connected to the patient, the amplifier is supplied with electric potentials generated by the heart. The R wave is amplified and supplied to the impulse producing gas tube 60, the control grid 64 of which is rendered more positive upon each occurrence of the R wave to render the tube conductive. Each time the tube is rendered conductive, the condenser 62 is discharged through the tube 60, resistor 74, condensed 80, and resistor 78. The electron ray tube 90 is connected to the resistor 78 and condenser 80 so that each time a discharge occurs, the electron ray tube blinks to indicate the occurrence of a heart beat.

Each time an R wave occurs and the tube 60 is rendered conductive to discharge condenser 62, the gas tube 100 is also rendered conductive. The condenser 102 thereupon discharges into condensers 104 and 144 and the average voltage of condenser 144 at any time is reflected as the voltage drop across the resistor 142. A portion of this voltage drop is applied to the control grid 154 of the tube 150 to control the flow of current through the meter 152, as heretofore described in detail, and the meter indicates the rate at which the heart is beating averaged over a very short period.

As heretofore indicated, one of the advantages of the present invention is that it requires no moving parts other than the indicator or meter 152, heretofore referred to. Another advantage of the invention resides in the fact that the condensers and resistors utilized to provide a control voltage proportional to the rate at which the heart is beating may be of relatively small values. These resistors may have values, for instance, as follows:

| | | |
|---|---|---|
| Condenser 102 | mfd | .05 to .08 |
| Condenser 104 | mfd | 4 |
| Condenser 144 | mfd | 4 |
| Resistor 146 | megohm | ½ |
| Resistor 142 | do | ½ |

Consequently, the condensers are of such size that they need not be of the electrolytic type which are objectionable because of large changes in internal resistance and capacity resulting from temperature changes and from aging. Such changes with electrolytic condensers would require constant recalibration in order to avoid errors. Such recalibration is not necessary with the present instrument. The resistors are also of such value that they are not affected by changes in atmospheric conditions such, for instance, as dampness, which may cause undesirable changes in the resistance of large resistors, as by deposit of moisture thereon.

In Fig. 2 there is illustrated a modified form of control voltage producing means 14 wherein a condenser is charged whenever the tube 100 is rendered conductive and discharged when the tube is nonconductive. This form of control voltage producing means can be utilized in place of that illustrated in Fig. 1 and like parts have been indicated by like reference characters for purpose of simplification.

The tube 100 has its plate 114 connected to the B supply line through switch 134, and conductors 136 and 70. Its cathode 118 is connected to one terminal of a first condenser 210, corresponding to condenser 102, the other terminal of which is connected to the junction of resistors 126 and 128 through a resistor 212 and conductor 124. Condenser 210 is shunted by resistor 214 and a second condenser 216 in series, the latter of which corresponds to condenser 104 of the embodiment of Fig. 1. Condenser 216 is in turn shunted by resistor 218 and condenser 220 in series corresponding to resistor 146 and condenser 144 of the embodiment of Fig. 1. Condenser 220 has connected across it the resistor 142 to which the grid 154 of tube 150 is connected through conductor 140 and adjustable contact 148.

In operation, the tube 100 is rendered conductive upon each occurrence of an R wave and condenser 210 charged to near the B supply potential before the tube is rendered non-conductive. When the tube is rendered non-conductive, condenser 210 discharges into condensers 216 and 220 and, as in the case of the embodiment of Fig. 1, there is produced across resistor 142 a control voltage proportional to the relatively instantaneous rate of heart beat. A portion of this control voltage is applied to the grid 154 of tube 150.

The arrangement of Fig. 2 utilizes circuit elements having values practically the same as those of Fig. 1 and has been found in practice to work satisfactorily. It does have a disadvantage not present in the arrangement of Fig. 1 in that each time tube 100 is rendered conductive a relatively large current is drawn from the B supply in order to charge condenser 210 quickly. Consequently, it requires a B supply of extremely good regulation so that the operation of the amplifier tubes, etc., will not be affected.

In the embodiment of Fig. 3 to which reference is now had, the plate 114 of tube 110 is connected to the B supply line 54 through the resistor 132, switch 134, and conductors 136 and 70. The cathode 118 is connected to the junction of resistors 126 and 128 through resistor 224 and conductor 124. A first condenser 226, corresponding to condensers 102 and 210 of the previously described embodiments is connected in shunt across the plate and resistor 224. Condenser 226 is shunted by resistor 228 and a second condenser 230 in series, the latter of which corresponds to condensers 104 and 216 of the other embodiments. Condenser 230 is shunted by resistor 232 and condenser 234 in series and the latter has connected across it the resistor 142.

The condenser 226 is charged, as are condensers 230 and 234, when the tube 100 is non-conductive. When the tube is rendered conductive upon occurrence of an R wave, condenser 226 discharges through the tube. Resistor 132 is large compared to resistors 228 and 232 so that, when condenser 226 is discharged, condenser 230 transfers part of the charge stored in it to condenser 226 faster than the latter is charged by the B supply. As a result, condensers 230 and 234 are discharged somewhat each time the tube is rendered conductive and the voltage across resistor 142 varies inversely with the frequency with which the tube 100 is rendered conductive. In other words, the more rapid the rate of heart beat, the less the voltage across resistor 142. In this embodiment, the circuit elements have much the same values as in the other embodiments.

This arrangement, while entirely practical, is not as advantageous as that of Fig. 1, because of the adverse effect of line voltage fluctuations on the B supply which are reflected in the voltage across resistor 142.

While the R wave has been described as the preferred wave for controlling the apparatus, other heart potential waves could be utilized, and certain features of the present invention could be used to advantage with apparatus wherein electrical waves are produced in synchronism with heart beats by movement of suitable mechanical-electrical translating means.

Having thus illustrated and described one embodiment of my invention and explained the nature thereof, what I claim and desire to secure by United States Letters Patent is as follows:

1. Apparatus for indicating the rate at which a heart is beating, including in combination, a condenser, means for normally charging said condenser, means including a first gas tube rendered conductive in response to an electric voltage generated by the heart and a second gas tube rendered conductive by said first tube and so connected in circuit with said condenser that said condenser is substantially completely discharged through said second tube each time the heart beats, and indicating means controlled in response to the frequency of discharge of said condenser.

2. Apparatus for indicating the rate at which a heart is beating, including in combination, a condenser, means for normally and quickly charging said condenser to a constant value, means controlled in response to heart beats for substantially completely discharging said condenser each time the heart beats, a second and larger condenser into which said first-mentioned condenser is discharged and whose average charge is thus varied in response to the heart beat rate, and indicating means controlled in response to the average charge of said second condenser.

3. Apparatus for indicating the rate at which a heart is beating, including in combination, a condenser, means including a normally non-conductive device in circuit with said condenser adapted to be rendered conductive for a predetermined time interval in response to a heart beat to charge said condenser to a substantially constant value each time the heart beats, a second and larger condenser permanently connected to the first condenser into which said first condenser discharges to vary the average charge of the second condenser in response to the heart beat rate, and indicating means controlled in response to the average charge of said second condenser.

4. Apparatus for indicating the rate at which a heart is beating, including in combination, means including an amplifier for supplying electrical waves in synchronism with heart beats, a condenser, a second condenser associated with said first mentioned condenser adapted to have its average charge controlled by the charging and discharging of said first condenser, means including a pair of gas tubes arranged so that one is rendered conductive in response to said heart waves and effects discharge of the first condenser through the second tube for controlling the average charge of said second condenser by charging and discharging said first condenser in synchronism with heart beats, and indicating means controlled in response to the average charge of said second condenser.

5. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, a first condenser, a second condenser associated with said first condenser and adapted to have its average charge controlled by the charging and discharging of said first condenser, means for normally charging said first condenser, means including a gas tube controlled in response to said amplified wave for substantially completely discharging said condenser upon each occurrence of said wave thereby to control the average charge of said second condenser, and indicating means connected to said second condenser and controlled in response to the frequency of discharge of said condenser.

6. Apparatus for indicating the rate at which a heart is beating, including in combination, means including an amplifier for supplying amplified electrical waves in synchronism with the heart beats, means connected to said amplifier for producing an electrical impulse upon each occurrence of a wave, a first condenser adapted to be charged and discharged, a second condenser having its average charge controlled by the charging and discharging of the first condenser, means controlled in response to said impulses for charging said first condenser to a substantially constant value and then discharging it upon each occurrence of an impulse to vary the average charge of said second condenser, and indicating means controlled in response to the average charge of said second condenser.

7. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave and a condenser adapted to be discharged when the tube is rendered conductive for producing an electrical impulse upon each occurrence of said wave, means including a second gas tube controlled in response to said impulses and adapted to be rendered conductive upon occurrence of each impulse and a condenser the charge of which is varied a definite amount when the tube is rendered conductive for producing a control voltage proportional to the rate at which said wave occurs, and indicating means controlled by said control voltage.

8. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave, a resistor in the plate-cathode circuit of the tube and a condenser adapted to be discharged through the tube and resistor when the tube is rendered conductive for producing an electrical impulse upon each occurrence of said wave, means including a gas tube having a grid connected to the cathode end of said resistor and adapted to be rendered conductive upon occurrence of each impulse, a first condenser, a second condenser in the cathode circuit of said second mentioned gas tube, means for normally charging said first condenser and means including said second gas tube for substantially completely discharging said first condenser into said second condenser each time the tube is rendered conductive, means including a resistor into which said second condenser discharges for producing a control voltage proportional to the rate at which said wave occurs, an electron tube having a grid connected to said resistor for varying the flow of current through said electron tube in response to said control voltage, and indicating means in circuit with said electron tube responsive to variations in current flow through the tube.

9. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave, a resistor in the plate-cathode circuit of the tube and a condenser adapted to be discharged through the tube and resistor when the tube is rendered conductive for producing an electrical impulse upon each occurrence of said wave, means including a gas tube having a grid connected to the cathode end of said resistor and adapted to be rendered conductive upon occurrence of each impulse, a condenser at the cathode end of the plate-cathode circuit of said tube adapted to be charged through the tube each time the tube is rendered conductive, a resistor and a second condenser connected across the first mentioned condenser and into which the first mentioned condenser discharges to vary its average charge a definite amount for each heart beat, means including a resistor connected across said second mentioned condenser for producing a control voltage proportional to the rate at which the wave occurs, and means including an electron tube and a meter controlled in response to said control voltage for indicating the heart beat rate.

10. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave, a resistor in the plate-cathode circuit of the tube and a condenser adapted to be discharged through the tube and resistor when the tube is rendered conductive for producing an electrical impulse upon each occurrence of said wave, means including a gas tube having a grid connected to the cathode end of said resistor and adapted to be rendered conductive upon occurrence of each impulse, a first condenser connected across the plate and cathode of said tube and a second condenser connected through a resistor across said first condenser, whereby both said condensers are normally charged and are discharged when the tube is conductive and the average charge of the second is dependent upon the frequency of the conductive periods of the tube, means including a resistor connected across said second condenser for producing a control voltage proportional to the rate at which the wave occurs, and means including an electron tube and a meter controlled in response to said control voltage for indicating the heart beat rate.

11. Apparatus for indicating the rate at which a heart is beating, including in combination, electric charge storing means, normally operative means for supplying said means with a substantially constant electric charge, means controlled in response to, but independent of, the amplitude and duration of a potential wave generated by the heart for discharging said charge storing means once during each heart cycle, said means including a normally non-conductive gas tube through which the charge storing means discharges and which is rendered conductive once each heart cycle for a length of time sufficient substantially completely to discharge said charge storing means, and indicating means controlled in response to the frequency with which said charge storing means is discharged.

12. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave, a resistor in the plate-cathode circuit of the tube and a condenser adapted to be discharged through the tube and resistor when the tube is rendered conductive for producing an electrical impulse upon each occurrence of said wave, means including a second gas tube having a grid connected to the cathode end of said resistor and adapted to be rendered conductive upon occurrence of each impulse, means controlled by said second gas tube for producing a control voltage proportional to the rate at which said wave occurs, an electron tube having a grid supplied with said control voltage for varying the flow of current through said electron tube in response to said control voltage, a second electron tube, means including a common power source for effecting flow of current through both of said electron tubes, current responsive indicating means connected across the cathodes of the electron tubes, and means including a potentiometer for varying the plate-cathode current of both said tubes for adjusting the zero reading of said indicating means.

13. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave, a resistor in the plate-cathode circuit of the tube and a condenser adapted to be discharged through the tube and resistor when the tube is rendered conductive for producing an electrical impulse upon each occurrence of said wave, means including a gas tube having a grid connected to the cathode end of said resistor and adapted to be rendered conductive upon occurrence of each impulse, means controlled by said second gas tube for producing a control voltage proportional to the rate at which said wave occurs, an electron tube having a grid supplied with said control voltage for varying the flow of current through said electron tube in response to said control voltage, a second electron tube, means including a common power source for effecting flow of current through both of said electron tubes, and current responsive indicating means connected across the cathodes of said tubes, the grid of the first mentioned electron tube being biased to be more negative than the grid of the second electron tube and the cathodes at the same potential when the meter reads zero.

14. In apparatus of the type described, the combination including, means providing a control voltage varying in response to the rate of the beating of a heart, an electron tube having a plate, cathode, and grid, means for supplying said control voltage to said grid, a source of direct current B voltage connected to the plate circuit of said tube, a second electron tube having a plate, cathode, and grid, means connecting the plate circuit of said second tube to said source of B voltage, a meter connected across said cathodes, and means for adjusting the current flow through the two tubes for adjusting the zero reading of said meter.

15. In apparatus of the type described, means providing a control voltage varying in response to the rate of the beating of a heart, an electron tube section having a plate, cathode, and grid, means for supplying said control voltage to said grid, a source of direct current B voltage connected to the plate, a bias resistor connected in circuit with the cathode, an electron tube section having a plate, cathode, and grid, said plate being connected to said source of B voltage, a bias resistor in circuit with the cathode of said second tube section, said first mentioned bias resistor being connected to said B supply at a point having a potential above that to which the second mentioned cathode resistor is connected, a connection from the grid of the second tube section to the end of the first mentioned bias resistor remote from the cathode, a meter connected between the two cathodes, and means for adjusting the zero reading of said meter including a potentiometer for simultaneously varying in opposite senses the current flow through the tube sections.

16. In apparatus of the type described, the combination including, means providing a control voltage varying in response to the rate of the beating of the heart, an electron tube having a plate, cathode, and grid, means for supplying said control voltage to said grid, a second electron tube having a plate, cathode, and grid, a common source of B voltage connected to the plates of said tubes, a meter connected across the cathodes of said tubes, and means including resistance means in the cathode circuits for biasing the grids of the tubes so that current flows through both tubes and so that the current flow through the second tube is greater than that through the first when the control voltage is zero.

17. In apparatus of the type described, the combination including, means providing a control voltage varying in response to the rate of the beating of the heart, an electron tube having a plate, cathode, and grid, means for supplying said control voltage to said grid, a second electron tube having a plate, cathode, and grid, a common source of B voltage connected to the plates of said tubes, a meter connected across the cathodes of said tubes, and means including resistance means in the cathode circuits for biasing the grids of the tubes so that the current flows through both tubes and so that the flow through the second tube is greater than that through the first and the cathodes are at the same potential when the control voltage is zero.

18. In apparatus of the type described, the combination including, means providing a control voltage varying in response to the rate of the beating of the heart, an electron tube having a plate, cathode, and grid, means for supplying said control voltage to said grid, a second electron tube having a plate, cathode, and grid, a common source of B voltage connected to the plates of said tubes, a meter connected across the cathodes of said tubes, and means including resistance means in the cathode circuits for biasing the grids of the tubes so that the current flows through both tubes and so that the flow through the second tube is greater than that through the first and the cathodes are at the same potential when the control voltage is zero, whereby said meter reads zero, and that both the tubes pass equal currents when the control voltage is such as to move said meter to substantially its midscale point.

19. In apparatus of the type described, means providing a control voltage varying in response to the rate of the beating of a heart, an electron tube having a plate, cathode, and grid, means for supplying said control voltage to said grid, a source of direct current B voltage connected to the plate, a bias resistor connected in circuit with the cathode, a second electron tube having a plate, cathode, and grid, said plate being connected to said source of B voltage, a bias resistor in circuit with the cathode of said second tube, said first-mentioned bias resistor being connected to said B supply at a point having a potential above that to which the second mentioned cathode resistor is connected, a connection from the grid of the second tube to the end of the first mentioned bias resistor remote from the cathode, a connection from the grid of the first tube to the end of the second mentioned bias resistor remote from the cathode, and a current responsive meter connected between the two cathodes.

20. Apparatus for visually indicating the occurrence of heart beats, including in combination, means including an amplifier for supplying electrical waves in synchronism with the heart beats, a gas tube having a plate, cathode, and a grid biased normally to be non-conductive, means including a connection from the grid to the amplifier output for rendering the tube conductive upon each occurrence of a wave, a condenser and resistor in the plate-cathode circuit of said tube, means for charging said condenser when the tube is non-conductive whereby said condenser is discharged through a circuit including said tube and resistor when the tube is rendered conductive, an electron ray tube of the indicating type having a control grid, and means connecting said grid to said discharge circuit whereby said electron ray tube visually indicates each heart beat.

21. Apparatus for visually indicating the occurrence of heart beats and the rate thereof, including in combination, an amplifier having an output and an input adapted to be supplied with potentials generated by the heart and arranged to amplify frequencies of the order of one of the generated potential waves, a gas tube having a plate, cathode and grid biased normally to be non-conductive, means including a connection from the grid to the amplifier output for rendering the tube conductive upon each occurrence of said one potential wave, a condenser and resistor in the plate-cathode circuit of said tube, means for charging said condenser when the tube is non-conductive whereby said condenser is discharged through a circuit including said tube and resistor when the tube is rendered conductive, an electron ray tube of the indicating type having a control grid, means including a gas tube having a control grid, electric charge storing means connected to and having its discharge variable by said last mentioned gas tube, and indicating means connected thereto and controlled in response to the charge of said charge storing means for indicating the rate at which the heart beats, and means connecting the grids of said electron ray tube and last mentioned gas tube to said discharge circuit whereby said electron ray tube visually indicates each heart beat and said indicating means indicates the rate of the heart beat.

22. In apparatus of the type described, the combination including, an amplifier including electron tubes having cathodes and cathode heaters for amplifying a heart potential wave, means including a gas tube having a cathode and cathode heater and connected to said amplifier for supplying a current impulse upon each occurrence of the potential wave, means including a second gas tube having a cathode and cathode heater and controlled in response to said current impulses for providing a control voltage proportional to the frequency of said impulses, means including an electron tube having a cathode and cathode heater and controlled in response to said control voltage for indicating the frequency of said impulses, a power pack including a rectifier for supplying B voltage to all said tubes, a first secondary winding for supplying heater current to all said tubes but said second gas tube and a second secondary winding for supplying heater current to the heater of said second gas tube only, and a connection from the cathode of said second gas tube to said second secondary winding.

23. Apparatus for visually indicating the occurence of heart beats, including in combination, means including an amplifier for supplying electrical waves in synchronism with the heart beats, a gas tube having a plate, cathode, and a grid biased normally to be non-conductive, means including a connection from the grid to the amplifier output for rendering the tube conductive upon each occurrence of a wave, a condenser and a resistor in the plate-cathode circuit of said tube, means for charging said condenser when the tube is non-conductive whereby said condenser is discharged through a circuit including said tube and resistor when the tube is rendered conductive, an electron ray tube of the visual indicating type having a control grid, means connecting the grid of said electron ray tube to said discharge circuit so that said electron ray tube provides a visual indication of the occurrence of a heart beat upon the discharge of said condenser, and means including a time delay circuit associated with said electron ray tube for increasing the duration of said visual indication.

24. Apparatus for indicating the rate at which a heart is beating, including in combination, an amplifier, means for supplying said amplifier with electric potentials generated by the heart, said amplifier being constructed and arranged to amplify frequencies of the order of one of the potential waves generated by the heart, means including a gas tube connected to the output of said amplifier adapted to be rendered conductive upon occurrence of said wave, a resistor in circuit with the tube, and a condenser adapted to be discharged through the tube and resistor when the tube is rendered conductive for producing an electrical impulse upon each occurrence of said wave, means including a second gas tube connected to said discharge circuit and controlled in response to said impulses and adapted to be rendered conductive upon occurrence of each impulse, a discharge condenser controlled by said second tube and the charge of which is varied when the second tube is rendered conductive and a storage condenser in circuit with said second tube the average charge of which is controlled by the variations in the charge of said discharge condenser for producing a control voltage proportional to the rate at which said wave occurs, and indicating means controlled by said control voltage.

25. Apparatus for indicating the rate at which a heart is beating, including in combination, means including an amplifier for supplying electrical waves in synchronism with the heart, means connected to the amplifier for producing an electrical impulse upon each occurrence of a wave, a condenser, means for normally charging said condenser, a second condenser associated with said first condenser and adapted to have its average charge controlled in response to the charging and discharging of said first condenser, means for normally charging said second condenser, means controlled in response to said impulses adapted to discharge said first condenser upon each occurrence of an impulse thereby to control the average charge of said second condenser, and indicating means controlled in response to the average of said second condenser.

26. Apparatus for indicating the rate at which a heart is beating, including in combination, first electric charge storing means, second electric charge storing means, indicating means controlled in response to the average charge of said second charge storing means, and means for varying the average charge of said second charge storing means by the charging and discharging of said first charge storing means, said last mentioned means including means connecting said second charge storing means to said first charge storing means, a gas tube in circuit with said first charge storing means for charging said first charge storing means, and means controlled in response to the potential waves generated by the heart for rendering said tube conductive for a short interval sufficient to charge said first charge storing means to substantially a constant value each time the heart beats.

27. Apparatus for indicating the rate at which a heart is beating, including in combination, first electric charge storing means, second electric charge storing means, indicating means controlled in response to the average charge of said second charge storing means, and means for varying the average charge of said second charge storing means by the charging and discharging of said first charge storing means, said last mentioned means including a gas tube in circuit with said first charge storing means, means including unidirectional impulse producing means controlled in response to the potential waves generated by the heart for rendering said tube conductive for a short interval sufficient to vary the charge of said first charge storing means a substantially constant amount each heart beat, and means associating said tube and charge storing means in circuit so that the average charge of said second charge storing means is controlled by the charging and discharging rate of said first charge storing means.

RALPH E. STURM.

REFERENCES CITED

The following references are of record in the file of this patent:

UNITED STATES PATENTS

| Number | Name | Date |
|---|---|---|
| 1,816,465 | Boas et al. | July 28, 1931 |
| 1,844,243 | Crout | Feb. 9, 1932 |
| 2,078,792 | Fitz Gerald | Apr. 27, 1937 |
| 2,110,438 | Cummings et al. | Mar. 8, 1938 |
| 2,114,578 | Strauss et al. | Apr. 19, 1938 |
| 2,137,846 | Klutke | Nov. 22, 1938 |
| 2,137,859 | Schwartz et al. | Nov. 22, 1938 |
| 2,193,945 | Strauss et al. | Mar. 19, 1940 |
| 2,245,717 | Roberts | June 17, 1941 |
| 2,273,532 | Lovell | Feb. 17, 1942 |
| 2,294,065 | Anderson | Aug. 25, 1942 |

OTHER REFERENCES

R. C. A. Receiving Tube Manual RC 14, pp. 30, 31.

Radio Amateur's Handbook, 20th ed., 1943, p. 54.

Henney, Electron Tubes in Industry, 1934 pp. 144, 202, 203, 209, 264, 265.

Certificate of Correction

Patent No. 2,439,495.                                                                      April 13, 1948.

RALPH E. STURM

It is hereby certified that errors appear in the printed specification of the above numbered patent requiring correction as follows: Column 3, lines 56 and 57, for "resistor 14" read *resistor 74*; column 4, line 23, after the word "beating" insert (*as explained hereinafter*); column 5, line 39, for "it lower" read *is lower*; column 6, line 25, before "preferably" insert an opening parenthesis; column 7, line 56, after "negative" insert *relative*; column 11, line 64, claim 5, before "condenser" insert *first*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*